United States Patent
Hampson

(10) Patent No.: US 11,442,189 B2
(45) Date of Patent: Sep. 13, 2022

(54) METHOD FOR DETERMINING NOTIONAL SEISMIC SOURCE SIGNATURES AND THEIR GHOSTS FROM NEAR FIELD MEASUREMENTS AND ITS APPLICATION TO DETERMINING FAR FIELD SOURCE SIGNATURES

(71) Applicant: DownUnder GeoSolutions Pty Ltd, West Perth (AU)

(72) Inventor: Gary Hampson, Peppermint Grove (AU)

(73) Assignee: DOWNUNDER GEOSOLUTIONS PTY LTD., West Perth (AU)

( * ) Notice: Subject to any disclaimer, the term of this patent is extended or adjusted under 35 U.S.C. 154(b) by 806 days.

(21) Appl. No.: 16/266,379

(22) Filed: Feb. 4, 2019

(65) Prior Publication Data
US 2019/0170889 A1  Jun. 6, 2019

Related U.S. Application Data

(63) Continuation of application No. PCT/US2017/042734, filed on Jul. 19, 2017.
(Continued)

(51) Int. Cl.
*G01V 1/38* (2006.01)
*G01V 1/36* (2006.01)

(52) U.S. Cl.
CPC ............ *G01V 1/3835* (2013.01); *G01V 1/364* (2013.01); *G01V 1/38* (2013.01); *G01V 1/3861* (2013.01);
(Continued)

(58) Field of Classification Search
CPC ........ G01V 1/3835; G01V 1/364; G01V 1/38; G01V 1/3861; G01V 2210/1212;
(Continued)

(56) References Cited

U.S. PATENT DOCUMENTS

| 6,018,494 A | 1/2000 | Laws |
| 6,049,507 A | 4/2000 | Allen |

(Continued)

FOREIGN PATENT DOCUMENTS

| GB | 2468912 A | * | 9/2010 | ............... G01V 1/38 |
| WO | 2015044207 A1 | | 4/2015 | |
| WO | WO-2017186648 A1 | * | 11/2017 | |

OTHER PUBLICATIONS

Russel, "Sound Fields Radiated by Simple Sources" https://www.acs.psu.edu/drussell/demos/rad2/mdq.html (Year: 2001).*

(Continued)

*Primary Examiner* — Krystine E Breier
(74) *Attorney, Agent, or Firm* — Richard A. Fagin

(57) ABSTRACT

A method for estimating a far field seismic energy source signature includes using detected near field seismic signals corresponding to actuation of each one of a plurality of seismic energy sources in an array of seismic energy sources. The near field seismic signals are detected at two spaced apart locations in the near field of each seismic energy source, the at least two spaced apart locations being arranged such that a direction of propagation of the detected near field seismic signals is determinable from the detected near field signals. A notional source signature for each seismic energy source and a notional ghost for each seismic energy source using the detected near field seismic signals. A far field signature is determined for the plurality of seismic energy sources using the determined notional source signature and notional ghost signature from each seismic energy source.

22 Claims, 7 Drawing Sheets

Related U.S. Application Data

(60) Provisional application No. 62/371,248, filed on Aug. 5, 2016.

(52) U.S. Cl.
CPC ............ *G01V 2210/1212* (2013.01); *G01V 2210/1293* (2013.01); *G01V 2210/1423* (2013.01); *G01V 2210/56* (2013.01); *G01V 2210/59* (2013.01)

(58) Field of Classification Search
CPC ... G01V 2210/1293; G01V 2210/1423; G01V 2210/56; G01V 2210/59
See application file for complete search history.

(56) References Cited

U.S. PATENT DOCUMENTS

| | | | |
|---|---|---|---|
| 6,493,636 | B1 | 12/2002 | DeKok |
| 7,440,357 | B2* | 10/2008 | Hopperstad ............... G01V 1/38 367/41 |
| 7,616,523 | B1 | 11/2009 | Tabti et al. |
| 9,897,712 | B2* | 2/2018 | Wisløff ................ G01V 1/3808 |
| 10,338,251 | B2* | 7/2019 | Lee ........................... G01V 1/36 |
| 2012/0072115 | A1* | 3/2012 | Laws .................... G01V 1/3861 702/14 |
| 2013/0201791 | A1 | 8/2013 | Parkes et al. |
| 2014/0036624 | A1* | 2/2014 | Tonchia ................... G01V 1/18 367/16 |
| 2014/0133272 | A1 | 5/2014 | Sallas et al. |
| 2014/0204701 | A1* | 7/2014 | Teyssandier ............. G01V 1/28 367/7 |
| 2014/0249757 | A1* | 9/2014 | Gratacos ................. G01V 1/34 702/16 |
| 2016/0231445 | A1* | 8/2016 | Payen ..................... G01V 1/006 |
| 2019/0170889 | A1* | 6/2019 | Hampson ................ G01V 1/38 |

OTHER PUBLICATIONS

Australian Examination Report dated Feb. 6, 2020, for Australian Patent Application No. 2017307058.
Australian Second Examination Report dated Jan. 4, 2021, for Australian Patent Application No. 2017307058.
International search report and written opinion, International Application No. PCT/US2017/042734 dated Oct. 13, 2017.

* cited by examiner

METHOD FOR DETERMINING NOTIONAL SEISMIC SOURCE SIGNATURES AND THEIR GHOSTS FROM NEAR FIELD MEASUREMENTS AND ITS APPLICATION TO DETERMINING FAR FIELD SOURCE SIGNATURES

CROSS REFERENCE TO RELATED APPLICATIONS

Continuation of International Application No. PCT/US2017/042734 filed on Jul. 19, 2017. Priority is claimed from U.S. Provisional Application No. 62/371,248 filed on Aug. 5, 2016. Both of the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of marine seismic surveying. More particularly the disclosure relates to methods for determining "notional" seismic energy source "signatures" and signatures of water surface reflected energy from near field seismic sensor measurements. The present disclosure is made in terms of air guns as the seismic energy sources and hydrophones as the seismic sensors, however the use of air guns and hydrophones is not intended to limit the scope of the present disclosure.

A publication on the subject of how to derive far field seismic energy source signatures from near field measurements (Ziolkowski et al., 1982) describes a solution to the problem of how to determine actual seismic energy source signatures while taking into account seismic energy interactions between seismic energy sources when a plurality of sources is used in a source array. The foregoing publication also discloses how to derive so called notional seismic energy source signatures. Notional source signatures never physically exist, but are a convenient construction because they can be combined by linear combination to determine the far field signature of a seismic energy source array.

Parkes et al. (1984) describes some practical details associated with the method disclosed by Ziolkowski et al., such as the effects of source and sensor motion and the relevance of the geometrical configuration of the source array to an essentially inverse problem. i.e., determining notional signatures of an array of seismic sources from near field measurements of seismic signals. Landro et al. (1991) and Ziolkowski & Johnson (1997) illustrate that geometry of an array of seismic sources is relevant to a method for determining far field signatures from a seismic source array.

The original formulation is disclosed in Ziolkowski et al. (cited above) and Parkes et al. (cited above) by the expression:

$$h_i(t) = \sum_{j=1}^{n} \frac{1}{r_{ji}} p_j(t - \tau_{ji}) + \alpha \sum_{j=1}^{n} \frac{1}{r_{gji}} p_j(t - \tau_{gji}) \quad (1)$$

in which $h_i(t)$ denotes the $i^{th}$ seismic sensor data recording, $p_j(t)$ denotes the $j^{th}$ notional source waveform, $r_{ji}$ denotes the time variant distance from the moving source bubble to the moving hydrophone, $\alpha$ is the free-surface reflectivity, $r_{gji}$ is the distance between a moving notional source to a moving seismic sensor (e.g., a hydrophone) and $\tau_{ji}$ is the time for seismic energy to travel from 1 meter from an airgun discharge bubble center to the moving seismic sensor:

$$\tau_{ji} = \frac{r_{ji} - 1}{c}. \quad (2)$$

Eq. (1) indicates that near-field seismic sensors record the contributions from each notional source (e.g., air gun) and each notional virtual source using appropriate delays and scaling for spherical divergence. The geometrical configuration is shown in FIG. 2 for a simple two air gun source array.

Eq. (2) may be used as a convenience in the original method so that Eq. (1) may be rewritten for solution in a more compact and efficient manner. In the following instead $\tau_{ji}$ may be used to represent the time taken between the moving seismic energy source and the moving seismic sensor. Likewise $\tau_{gji}$ may be used to represent the time taken between the moving virtual seismic energy source and the moving seismic sensor.

Eq. (1) also includes a term for the free surface reflectivity (e.g., the air-water interface in marine seismic surveying) to scale the notional virtual sources. Without loss of generality Eq. (1) may be rewritten in convolutional form:

$$h_i(t) = \sum_{j=1}^{n} p_j(t) * [\delta(t - \tau_{ji})/r_{ji} + \alpha\delta(t - \tau_{gji})/r_{gji}] \quad (3)$$

in which all the details of the geometry, motion and reflectivity are contained in the square brackets. For each notional source, i, and each near field sensor (e.g., hydrophones), j, the terms in brackets may be expressed as the sum of two convolutional matrices, $D_{ij}+G_{ij}$. The term $D_{ij}$ may be formed by taking the identity matrix and convolving each column in the identity matrix with $\delta(t-\tau_{ji})/r_{ji}$. Similarly, $G_{ij}$ may be formed by taking the identity matrix and convolving each column with $\alpha\delta(t-\tau_{gji}/r_{gji}$. Eq. (1) may then be rewritten in block matrix form as $$\left( \begin{pmatrix} D_{11} & D_{1j} & \cdots & D_{1n} \\ D_{i1} & D_{ii} & \cdots & D_{in} \\ \vdots & \vdots & \ddots & \vdots \\ D_{m1} & D_{mj} & \cdots & D_{mn} \end{pmatrix} + \begin{pmatrix} G_{11} & G_{1j} & \cdots & G_{1n} \\ G_{i1} & G_{ii} & \cdots & G_{in} \\ \vdots & \vdots & \ddots & \vdots \\ G_{m1} & G_{mj} & \cdots & G_{mn} \end{pmatrix} \right) \cdot \begin{pmatrix} p_1 \\ p_j \\ \vdots \\ p_n \end{pmatrix} = \begin{pmatrix} h_1 \\ h_i \\ \vdots \\ h_m \end{pmatrix} \quad (3)$$

in which it is clear how the near-field seismic sensors receive contributions from each notional source. For brevity Eq. (3) may be rewritten as:

$$(\tilde{D}+\tilde{G})\tilde{p}=\tilde{R}\tilde{p}=\tilde{h}, \quad (4)$$

in which tilde denotes a block matrix or vector. Current practice is that m=n and so a solution to Eq. (4) may be determined by numerical inversion of $\tilde{R}$. Because the dimension of Eq. (4) is likely to be on the order of 100 it has been a substantial challenge for computer memory and speed to determine a solution. Parkes et al. (cited above) discloses the use of an iterative algorithm (Gauss-Seidel) to reduce computer memory use and under certain circumstances may converge within a small number of iterations. Hargreaves et al. (2015) applied a least squares inversion by transforming the problem into the frequency domain, but using only approximations to the bubble and hydrophone motion.

The condition of the system in Eq. (4) has influence on whether and how fast an iterative method converges. The invertability of $\tilde{R}$ is a direct consequence of the geometrical configuration of the seismic energy sources and seismic sensors. Furthermore, in general this geometrical arrangement is time variant due to the motion of air gun discharge bubbles and motion of the near field seismic sensors (e.g., hydrophones) during a seismic survey.

DETAILED DESCRIPTION

Figure 1:
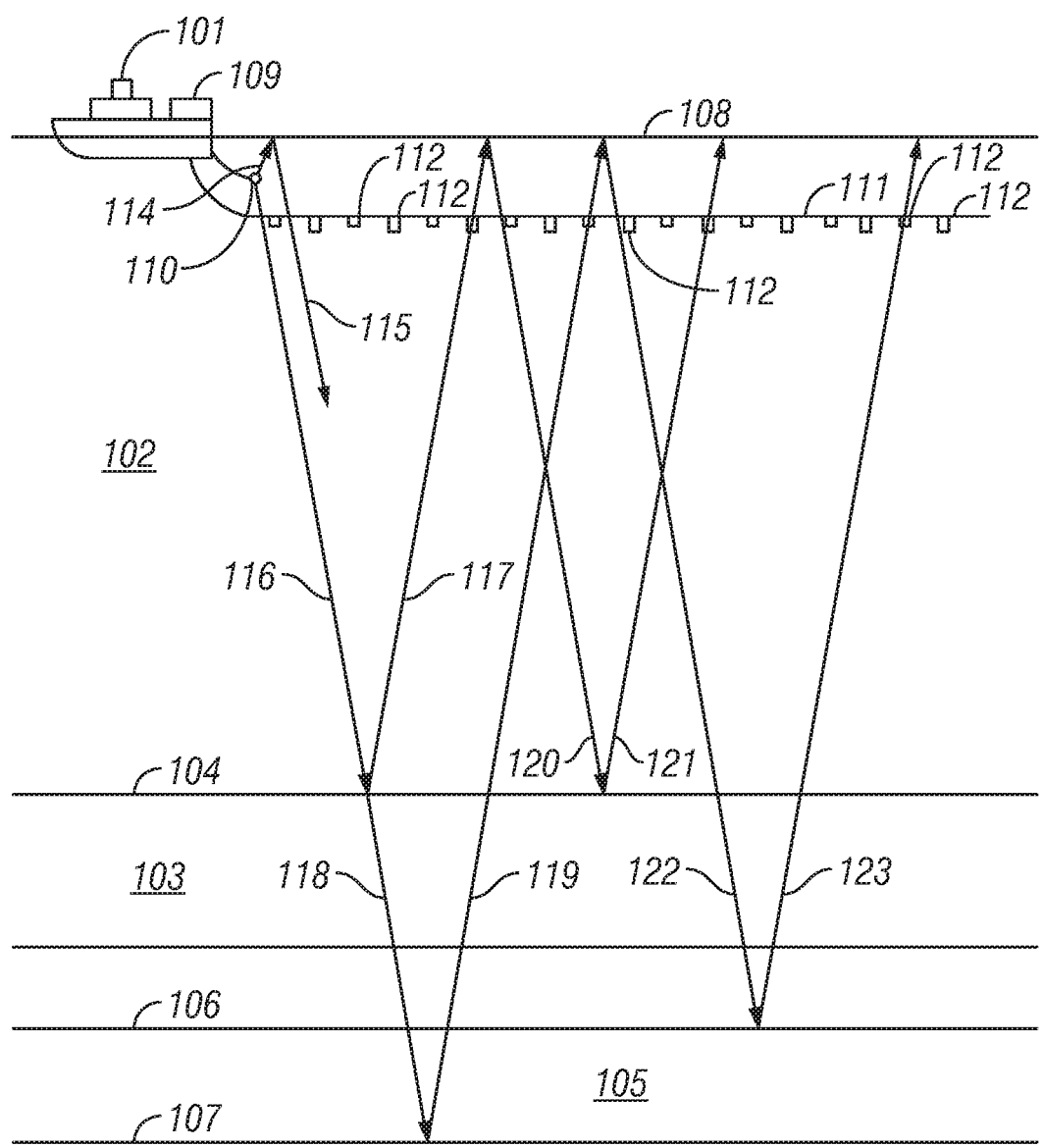
FIG. 1 shows an example embodiment of marine seismic data acquisition.

FIG. 1 shows an example of acquiring marine seismic data that can be used with the method of the present disclosure. A seismic vessel 101 moves along the surface 108 of a body of water 102 above a portion 103 of the subsurface that is to be surveyed. Beneath the water bottom 104, a portion 103 of the subsurface contains formations of interest such as a layer 105 positioned between an upper boundary 106 and lower boundary 107 thereof. The seismic vessel 101 contains seismic acquisition control equipment, designated generally at 109. The seismic acquisition control equipment 109 includes navigation control, seismic energy source control, seismic sensor control, and signal recording equipment, all of which can be of types well known in the art.

The seismic acquisition control equipment 109 causes a seismic source 110 towed in the body of water 102 by the seismic vessel 101 (or by a different vessel) to actuate at selected times. The seismic source 110 may be of any type well known in the art of seismic acquisition, including air guns or water guns, or particularly, arrays of air guns.

Seismic streamers 111 are also towed in the body of water 102 by the seismic vessel 101 (or by a different vessel) to detect the acoustic wave fields initiated by the seismic source 110 and reflected from interfaces in the environment. Although only one seismic streamer 111 is shown in FIG. 1 for illustrative purposes, typically a plurality of laterally spaced apart seismic streamers 111 are towed behind the seismic vessel 101. The seismic streamers 111 contain longitudinally spaced apart seismic sensors to detect the reflected wave fields initiated by the seismic source 110. In the present example the seismic streamers 111 contain pressure responsive or pressure time gradient responsive seismic sensors such as hydrophones, shown generally at 112. The hydrophones 112 are typically disposed in multiple sensor arrays at regular intervals along the seismic streamers 111. However, the type of seismic sensors and their particular locations along the seismic streamers 111 are not intended to be limitations on the present disclosure.

Each time the seismic source 110 is actuated, an acoustic wave field travels in spherically expanding wave fronts. The propagation of the wave fronts will be illustrated herein by ray paths which are perpendicular to the wave fronts. An upwardly traveling wave field, designated by ray path 114, will reflect off the water-air interface at the water surface 108 and then travel downwardly, as in ray path 115, where the wave field may be detected by the hydrophones 112 in the seismic streamers 111. Such a reflection from the water surface 108, as in ray path 115 contains no useful information about the subsurface formations of interest. However, such surface reflections, also known as ghosts, act as secondary seismic sources with a time delay from initiation of the seismic source 110.

The downwardly traveling wave field, in ray path 116, will reflect off the earth-water interface at the water bottom 104 and then travel upwardly, as in ray path 117, where the wave field may be detected by the hydrophones 112. Such a reflection at the water bottom 104, as in ray path 117, contains information about the water bottom 104. Ray path 117 is an example of a "primary" reflection, that is, a reflection originating from a boundary in the subsurface. The downwardly traveling wave field, as in ray path 116, may transmit through the water bottom 104 as in ray path 118, reflect off a layer boundary, such as 107, of a layer, such as 105, and then travel upwardly, as in ray path 119. The upwardly traveling wave field, ray path 119, may then be detected by the hydrophones 112. Such a reflection off a layer boundary 107 contains useful information about a formation of interest 105 and is also an example of a primary reflection.

The acoustic wave fields will continue to reflect off interfaces such as the water bottom 104, water surface 108, and layer boundaries 106, 107 in combinations. For example, the upwardly traveling wave field in ray path 117 will reflect off the water surface 108, continue traveling downwardly in ray path 120, may reflect off the water bottom 104, and continue traveling upwardly again in ray path 121, where the wave field may be detected by the hydrophones 112. Ray path 121 is an example of a multiple reflection, also called simply a "multiple", having multiple reflections from interfaces. Similarly, the upwardly traveling wave field in ray path 119 will reflect off the water surface 108, continue traveling downwardly in ray path 122. Such reflected energy as in ray path 122 may be detected by one or more of the hydrophones 112, thus creating a ghost referred to as a "receiver side ghost", the effects of which on the desired seismic signal are similar in nature to the previously described ghost. The seismic energy may reflect off a layer boundary 106 and continue traveling upwardly again in ray path 123, where the wave field may be detected by the hydrophones 112. Ray path 123 is another example of a multiple reflection, also having multiple reflections in the subsurface.

The hydrophones 112 are shown as single sensors for clarity of the illustration provided by FIG. 1. Other embodiments may include combinations of individual sensors or sensor arrays, including without limitation, combination hydrophones and particle motion responsive sensors such as geophones or accelerometers. In some embodiments, hydrophones or other types of pressure responsive sensors and particle motion responsive sensors may be arranged in substantially collocated pairs. See, for example, U.S. Pat. No. 7,123,543 issued to Vaage et al. The hydrophones 112 are spaced away from the source 110 so as to be substantially insensitive to near field energy from the source 110.

Every reflection event in the detected seismic signals (e.g., as detected by the hydrophones 112 in FIG. 1) is distorted by the far field signature of the seismic energy source, which reduces the interpretability and utility of the data. Knowing the far field signature, by, for example, the methods discussed, permits the removal of said distortions (sometimes referred to as signature deconvolution). Those skilled in the art will be aware of a variety of techniques to perform signature deconvolution. One example of how this might be performed is by the division of the Fourier transforms of the data and the far field signature. Thus, in some embodiments, the determined far field signature may be used to correct distortions in the detected seismic signals.

Figure 1A:
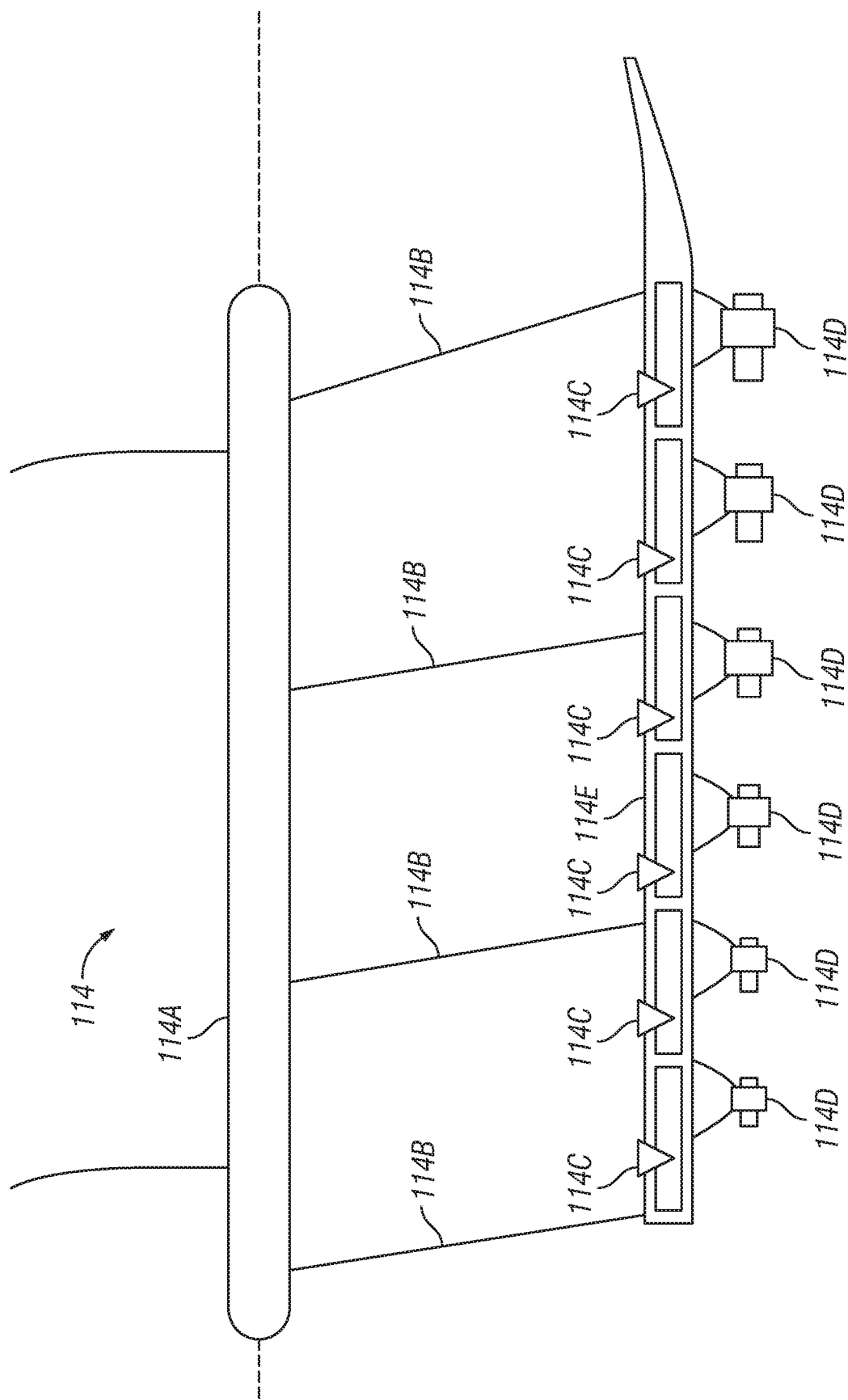
FIG. 1A shows an example embodiment of a source array having near field seismic sensors.

FIG. 1A shows an example embodiment of the seismic energy source 110 in more detail. The source 110 may be assembled to a float 110A or similar buoyancy device to suspend the active elements of the source 110 at selected depths in the water. Near field sensors 110C therein, e.g., hydrophones, may each be connected to a gun plate 110E affixed to the float 110A at a selected depth in the water, e.g., by ropes or cables 110B. The near field sensors 110C may each be associated with a corresponding single air gun or a selected cluster of air guns, shown generally at 110D. One or more air guns 110D may be suspended from the gun plate 110E proximate to each near field sensor 110C using, e.g., a chain. Having explained an example embodiment of apparatus used in marine seismic data acquisition, methods according to the present disclosure will now be explained.

The above described matrix of Eq. (4) need not be square. There may be advantages in having more equations than unknowns (see, e.g., Ziolkowski & Johnston, 1997). Signals from additional hydrophones could be used in a least squares manner, used as spares, used to check solutions or to obtain additional data to determine the existence of related problems.

The main diagonal blocks of $\tilde{R}$, that is, in $R_{ii}$, are stronger and arrive closer to the main diagonal than in $R_{ii\{i \neq j\}}$ so long as each $i^{th}$ near field sensor (110C in FIG. 1A) is located closest to each $j^{th}$ gun (110D in FIG. 1A). As a result, for m=n, Eq. (4) is diagonally dominant and therefore more likely to be well conditioned, particularly for the Gauss-Seidel method which requires diagonal dominance.

Solution of Eq. (4) may be facilitated by using a more stable method than Gauss-Seidel inversion, which can fail under a number of circumstances. It may be desirable to solve Eq. (5) using a least squares method. In other words, the intent is to solve the expression.

$$\tilde{R}^T\tilde{R}\tilde{p}=\tilde{R}^T\tilde{h}, \tag{5}$$

without forming the normal equations. In the present example embodiment LSQR (Paige & Saunders, 1982) may be used to solve Eq. (4) in a least squares sense. LSQR is a robust solver with excellent numerical properties.

A range of experience indicates that the ghost term in above described Eq. (1) may not be an accurate description to fit observations of source ghost behavior. Many experiments indicate that the magnitude and form of the ghost reflection remain unresolved.

Figure 2:
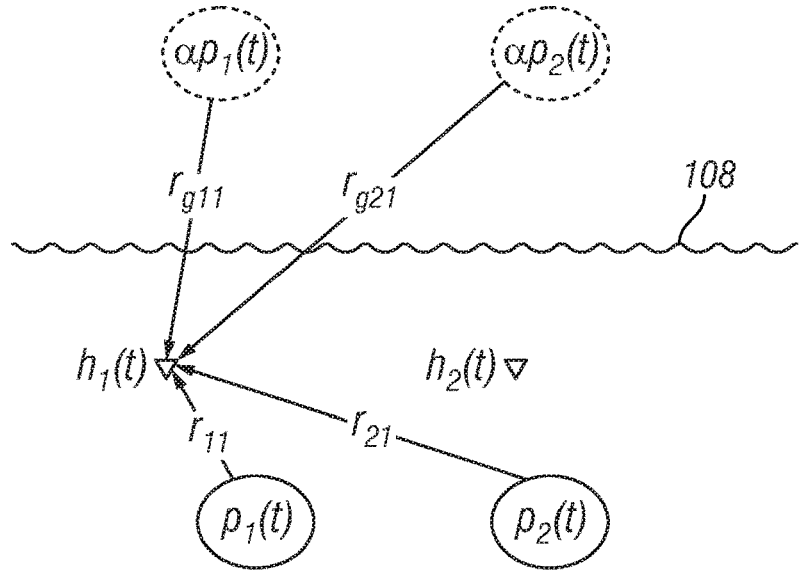
FIG. 2 shows the components contributing to a near field hydrophone signal recording for a simple 2 gun source array.

A number of researchers have noted that the ghost from an airgun array may behave in ways that are unexpected or not well understood. See, Kragh & Combee (2000) acquired seismic data over the Orca Basin haline reflector in the Gulf of Mexico. The foregoing publication discloses the use of the free surface reflection to study ghost behavior. In FIG. 2 of the foregoing reference the spectra of sensor ghosts and source ghosts are shown. The foregoing reference provides no explanation for the markedly weak source ghosts present in the disclosed high quality far field experiment.

In the case of high pressure acoustic fields, current knowledge of near surface physics is incomplete to the extent that it has not yet been determined how to robustly predict ghost behavior. Under sufficiently large stresses, non-linear behavior of the acoustic wavefield will undoubtedly occur. If absolute pressure in the water drops to the point at which cavitation occurs, pressure minima will be clipped. Non-linear acoustic waves will leak energy between frequencies. Energy may be lost from a non-linear wavefield as heat. Reflectivity at the free surface may become non-linear so that the reflectivity depends upon the nature of the incident wavefield. In addition it should be noted that a linear property such as the independence of waves traveling in different directions may no longer hold and reflected waves will interact with incident waves implying a "zone" of reflection behaviour (see for example, Wojcik (2004)).

Thus, there is reason to question the validity of assuming that the free-surface behaves as a linear system with a nominal reflectivity operator, r. As a consequence, non-linear behavior near the free surface alluded to in the foregoing cited publications may be taken into account. However, instead of trying to predict complex behavior of the free surface from first principles, the present disclosure provides a new method in which the effective wavefield reflected from the free-surface above a seismic source is derived based upon near field seismic signal measurements. In methods according to the present disclosure the notional source method may be modified to solve not only for the notional sources, but also, for the linear radiated acoustic wavefield resulting from the ghost acting upon the seismic source energy. In the description that follows the term "notional source" will be used in the accepted sense, but in addition the term "notional ghost" is introduced to describe the linear radiated wavefield due to the ghost acting upon the source energy. In methods according to the present disclosure it may only be assumed that the notional ghost behaves as a notional monopole situated symmetrically in depth with reference to the notional source and that the motion of the rising bubble from each air gun is also mirrored. It may be assumed that any non-linear behavior at the free surface will be included in the linearly radiated wavefield.

Begin by assuming that the near field seismic sensors (e.g., hydrophones) measure a superposition of the notional sources $p_j$ and the notional ghosts, $a_j$, both scaled and delayed appropriately for the geometry of the source elements and near field sensor elements. The results of the incidence of the source energy on the free-surface and any other associated physics (except kinematics and divergence)

is assumed to be contained in the notional ghost. With these considerations Eq. (1) may be modified so that:

$$h_i(t) = \sum_{j=1}^{n} \frac{1}{r_{ji}} p_j(t - \tau_{ji}) + \sum_{j=1}^{n} \frac{1}{r_{gji}} a_j(t - \tau_{gji}). \quad (6)$$

Because there are twice as many unknowns, twice as many measurements are needed, that is, m≥2n. Eq. (7) accommodates the ghost effect by no longer assuming it is merely a polarity reversed, scaled notional source. Eq. (7) provides the opportunity, at least in principle, to better fit measured seismic signals.

Eq. (7) may be rewritten in the convolutional form of Eq. (6):

$$h_i(t) = \sum_{j=1}^{n} p_j(t) * \delta(t - \tau_{ji})/r_{ji} + \sum_{j=1}^{n} a_j(t) * \delta(t - \tau_{gji})/r_{gji} \quad (7)$$

and expressed in block matrix form similar to Eq. (3):

$$\begin{pmatrix} D_{11} & D_{1j} & \dots & D_{1n} & G_{11} & G_{1j} & \dots & G_{1n} \\ D_{i1} & D_{ii} & \dots & D_{in} & G_{i1} & G_{ii} & \dots & G_{in} \\ \vdots & \vdots & & \vdots & \vdots & \vdots & & \vdots \\ \vdots & \vdots & & \vdots & \vdots & \vdots & & \vdots \\ D_{m1} & D_{mj} & \dots & D_{mn} & G_{m1} & G_{mj} & \dots & G_{mn} \end{pmatrix} \cdot \begin{pmatrix} p_1 \\ p_j \\ \vdots \\ p_n \\ a_1 \\ a_j \\ \vdots \\ a_n \end{pmatrix} = \begin{pmatrix} h_1 \\ h_i \\ \vdots \\ h_m \end{pmatrix} \quad (8)$$

in which, as before, $D_{ij}$ is formed by taking the identity matrix and convolving each column with $\delta(t-\tau_{ji})/r_{ji}$. However, now $G_{ij}$ is formed by taking the identity matrix and convolving each column with $\delta(t-\tau_{gji})/r_{gji}$ because the reflectivity of the free surface may be absorbed into $a_j$. For brevity Eq. (8) may be rewritten as:

$$(\tilde{D} \mid \tilde{G}) \cdot \begin{pmatrix} \tilde{p} \\ \tilde{a} \end{pmatrix} = \tilde{h}. \quad (9)$$

From a physical point of view, Eq. (8) has more unknowns as compared to Eq. (4). Not only should m≥2n, but also the extra measurements must bring new information. So, for example, if m/2 new near field hydrophones were placed too close to the original near field hydrophones, little extra information would be provided which would result in: rank($\tilde{D}|\tilde{G}$)≤m.

Figure 3:
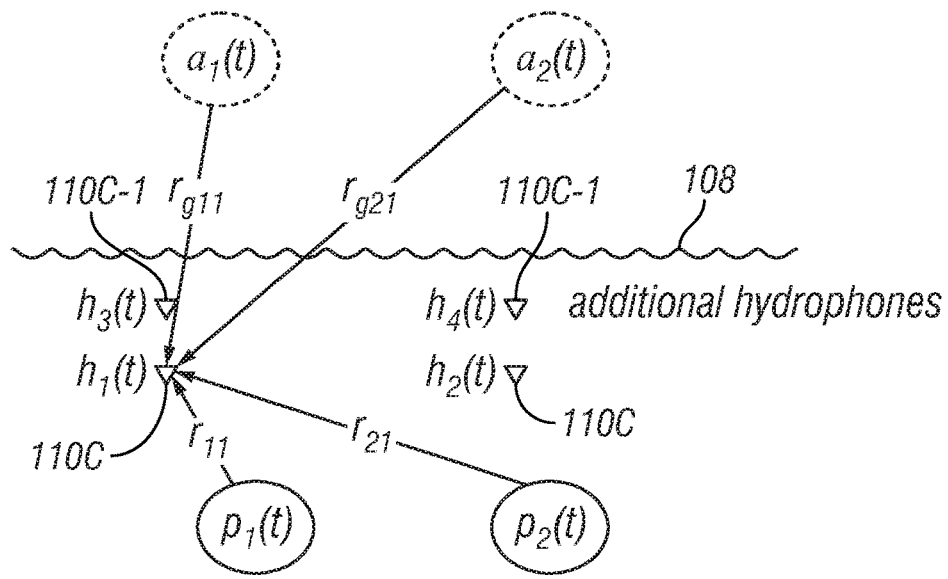
FIG. 3 shows an example seismic sensor (e.g., hydrophone) arrangement that may be used to detect a notional ghost and notional sources. In order to detect the seismic energy propagation direction the seismic sensors may be vertically displaced from each other at any same longitudinal distance from the source array.

The notional sources are typically detected by the seismic sensors as up-going waves, whereas the notional ghosts are detected as down-going waves. This suggests from a physical standpoint that additional measurements may be made from positions selected so that up-going and down-going seismic energy can be separated, that is, each individual air gun in a gun array should have at least 2 near field seismic sensors associated with it and that such two sensors should be vertically separated in an "over-under" configuration. An example of such a configuration is shown in FIG. 3. The geometrical configuration of FIG. 3 includes, for each near field sensor 110C, an additional near field sensor 110C-1 situated vertically above near field each sensor 110C.

Other near field receiver arrangements that detect wave direction, such as a hydrophone and particle motion detector (particle displacement, particle velocity or particle acceleration) are also feasible provided that the fidelity of the detection is sufficient.

From the standpoint of linear algebra, the matrix ($\tilde{D}|\tilde{G}$) should be well conditioned so that Eq. (9) may be robustly solved. It was noted earlier that having the foregoing matrix be well conditioned may depend on the geometry of the seismic sensors and air gun discharge bubbles. It is possible to test the suitability of any particular geometrical configuration of seismic sources and seismic sensors by computing the condition of ($\tilde{D}|\tilde{G}$), without the need to actuate the sources and record a near field seismic signal.

Figure 4:
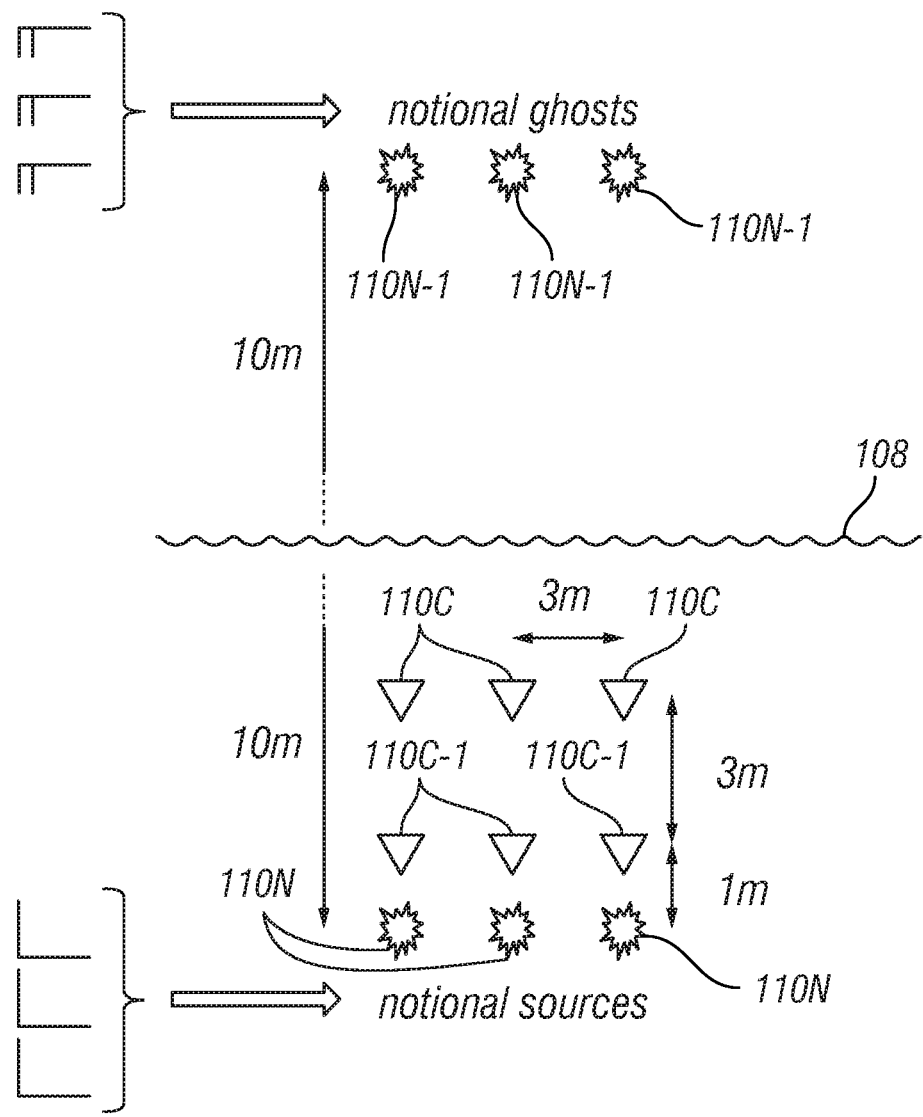
FIG. 4 shows a configuration of a simple test to demonstrate the derivation of notional ghost functions. A 3-gun seismic source array has 6 near field seismic sensors. The notional sources are Dirac delta functions; the notional ghosts are pairs of half amplitude negative Dirac delta functions.

In order to demonstrate the validity of the present example method a simple three airgun model with a known solution may be constructed. The geometrical configuration for this demonstration is shown in FIG. 4, wherein the near field sensors 110C and 110C-1 are arranged as described above with reference to FIG. 3. The notional sources 110N may be modelled as Dirac delta functions, δ(t) and the notional ghosts 110N-1 as two half strength, Dirac delta functions on adjacent samples, δ(t)/2+δ(t−Δt)/2.

Figure 5:
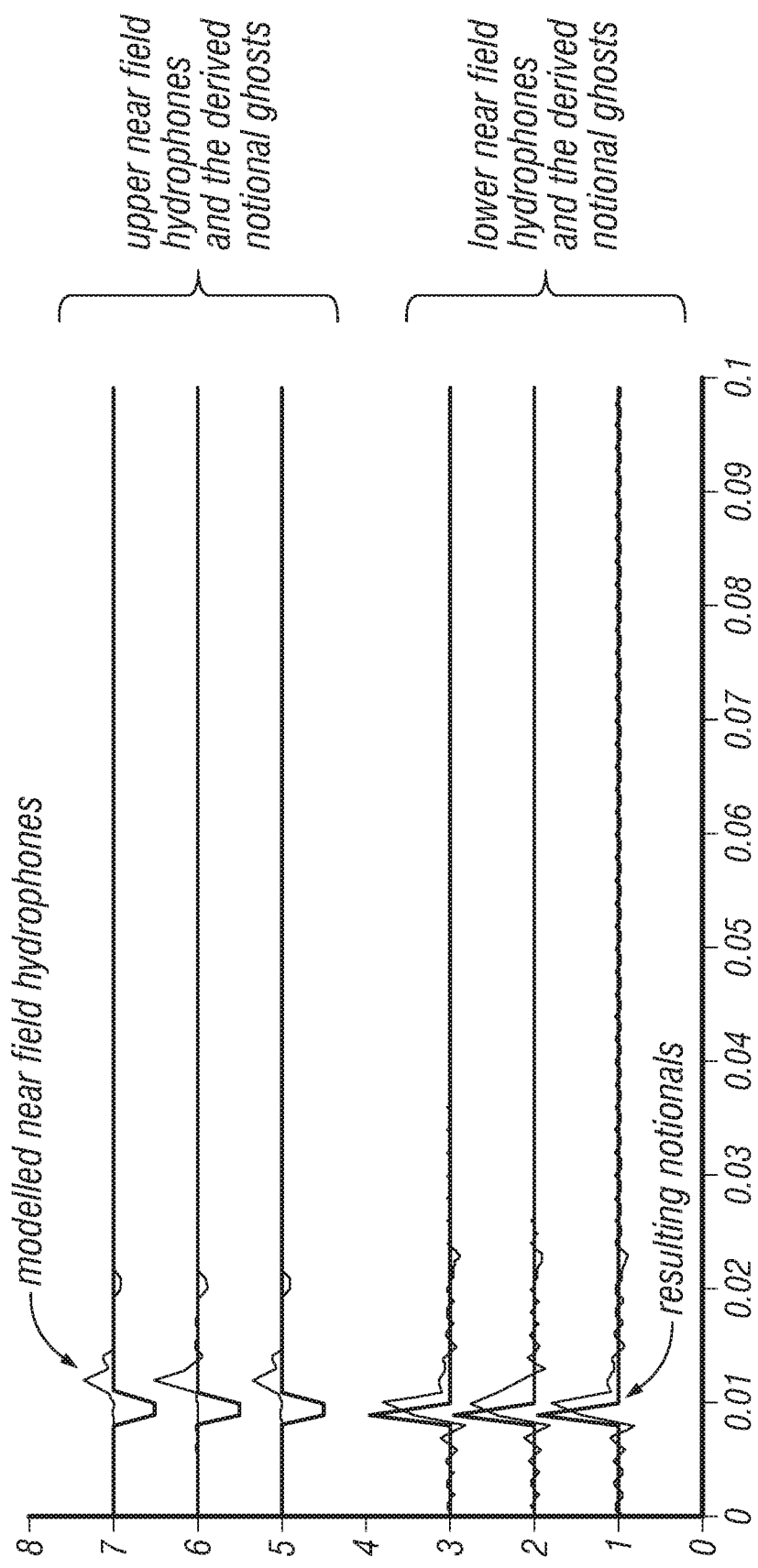
FIG. 5 shows modelled near field hydrophone data for a simple 3-gun spike test. The resulting notional ghosts and signatures are shown. These correspond accurately to the notional functions used to generate the model data.

The modelled near field sensor recordings, along with the results of inverting for notional sources and notional ghosts are shown in FIG. 5. The derived notional sources and ghosts correspond accurately with those used to generate the model data.

The known notional source method uses the assumption that the free surface (e.g., water-air interface, see 108 in FIG. 1) reflectivity is a simple scalar. By contrast, however, a variety of publications suggest that the free-surface above a seismic source such as an air gun may behave differently, indeed it seems likely that the free surface behaves nonlinearly. In such instances it becomes very difficult to adequately model the effective reflectivity. Here it has been proposed that rather than modelling such reflected notional sources, (i.e., the "notional ghosts"), The actual surface reflectivity may be derived from measured seismic data. The notional ghosts may be derived from an extension of the notional source method. The extension to the notional source method may require at least twice as many near field seismic measurements as previously taken in such a way that the additional near field seismic measurements generate independent equations relating the notional source and notional ghost functions to the observed near field measurements. It seems physically reasonable to deploy the additional near field seismic sensors in such a way as to be able differentiate between up-going and down-going wave field components. The method has been demonstrated on a simple, precisely controlled model.

Once the near field signature of each seismic energy source in the array has been determined as above using notional sources and notional ghosts, a far field signature of the seismic energy sources may be calculated, e.g., as described in the Parkes et al. 1984 reference described above.

The terms "near field", "far field" and "notional" have well defined meanings:

Near field: a location in an acoustic wave field where $1/r^2$ terms in the particle velocity field are important, where r represents the distance from the source. Near field implies that r<λ (λ represents the wavelength of the energy from the seismic energy source).

Far field: a location in an acoustic wavefield where $1/r^2$ terms in the particle velocity field are no longer important. Far field implies, $r \gg \lambda$.

Notional source: a conceptual monopole sound source, a number of which may be combined linearly to predict the acoustic wavefield pressure at any distance from the source (near or far field).

Near and far field source signatures may be made from the superposition of notional sources as described with reference to Eq. (1).

A near field signature of an array of more than one seismic energy source (e.g., air gun) and/or near the free surface cannot generally be converted to a far field signature. Elements of a process according to the present disclosure include, without limitation:

1. Entering as input to a programmed computer measured near field seismic signatures at least twice as many positions as recommended by Ziolkowski et al. (1982), for example, half of which are vertically displaced from the other.
2. Invert Eq. (9) for the notional sources and notional ghosts, $\tilde{p}$ and $\tilde{a}$.
3. Appropriately combine linearly $\tilde{p}$ to predict the far field signature, or $\tilde{p}$ and $\tilde{a}$ to predict the ghosted far field signature.

Figure 6:
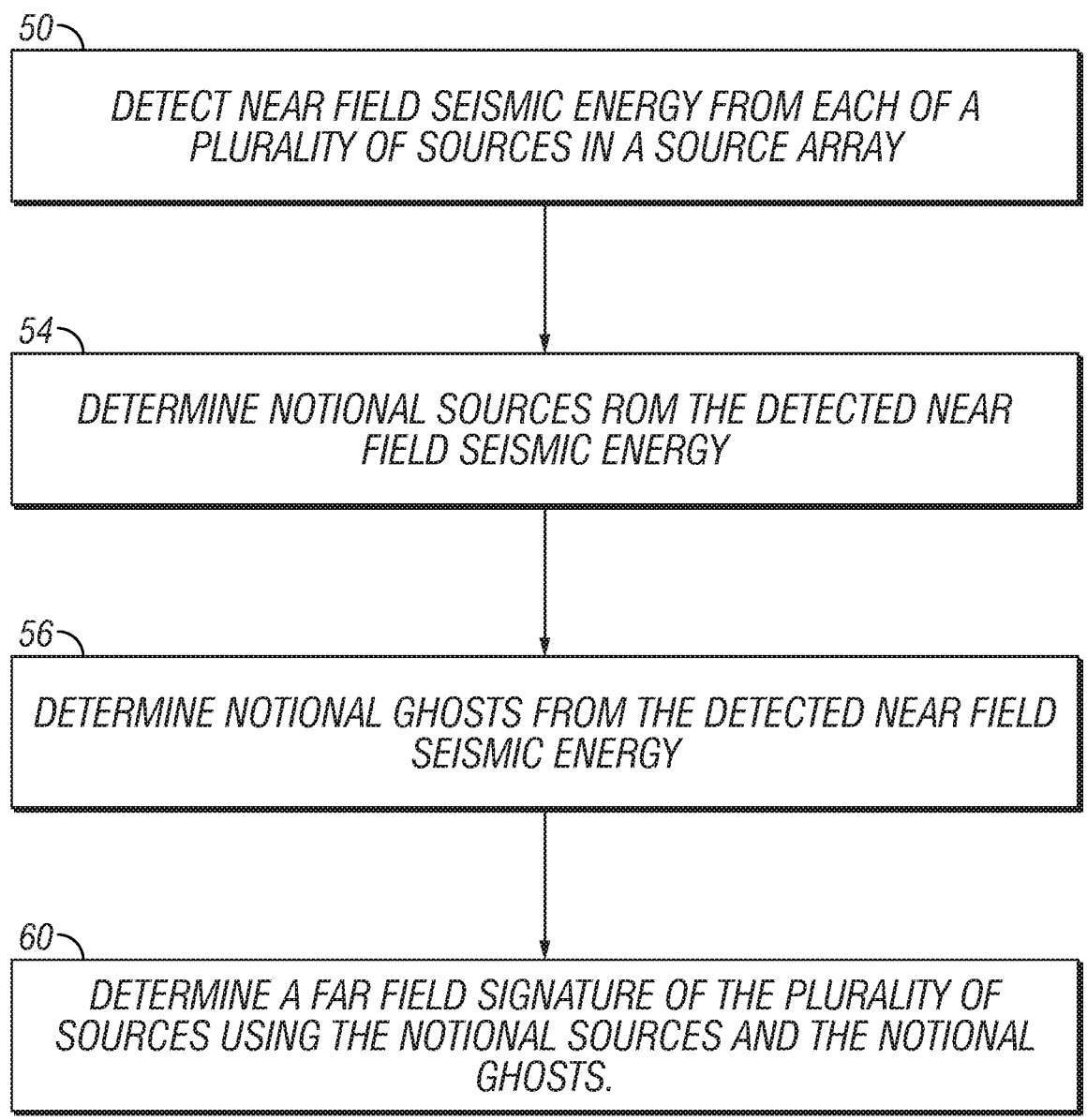
FIG. 6 shows a flow chart of an example embodiment of a method according to the present disclosure.

A flow chart of an example embodiment of a method according to the present disclosure is shown in FIG. 6. At 50 near field seismic energy is detected from each source in a source array. At 54, a notional source is determined for each source in the array using the near field seismic signal measurements. At 56, a notional ghost is determined for each source in the array using the near field seismic signal measurements. At 60, the notional signatures and notional ghosts are used to determine a far field source signature. The far field signature may be used in many different forms of seismic data processing.

Figure 7:
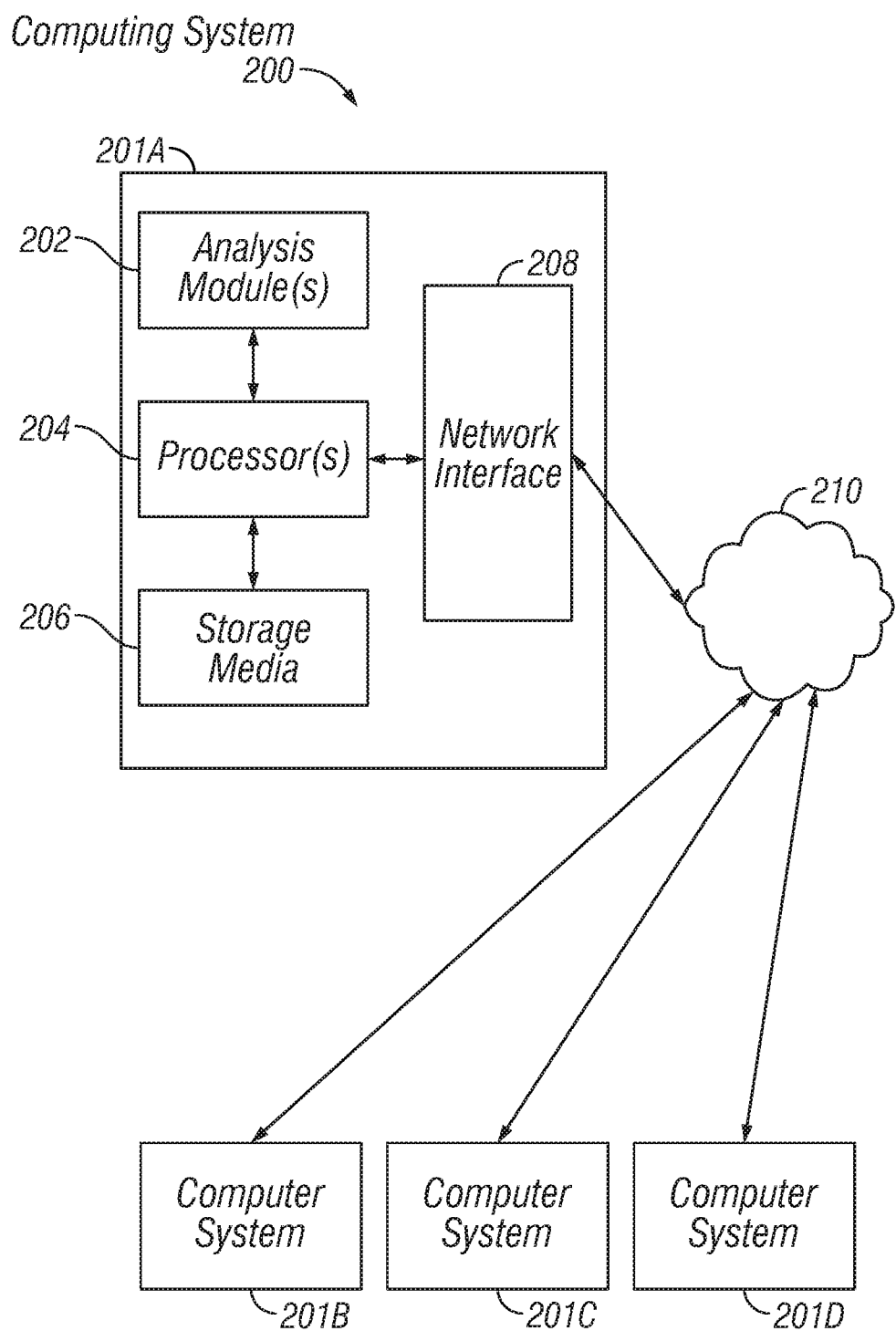
FIG. 7 shows an example processor and processing system that may be used in some embodiments.

All of the above calculations may be performed in any general purpose or purpose specific computer or processor. FIG. 7 shows an example computing system 200 in accordance with some embodiments. The computing system 200 may be an individual computer system 201A or an arrangement of distributed computer systems. The individual computer system 201A may include one or more analysis modules 202 that may be configured to perform various tasks according to some embodiments, such as the tasks explained with reference to FIGS. 2-6. To perform these various tasks, the analysis module 202 may operate independently or in coordination with one or more processors 204, which may be connected to one or more storage media 206. A display device 205 such as a graphic user interface of any known type may be in signal communication with the processor 204 to enable user entry of commands and/or data and to display results of execution of a set of instructions according to the present disclosure.

The processor(s) 204 may also be connected to a network interface 208 to allow the individual computer system 201A to communicate over a data network 210 with one or more additional individual computer systems and/or computing systems, such as 201B, 201C, and/or 201D (note that computer systems 201B, 201C and/or 201D may or may not share the same architecture as computer system 201A, and may be located in different physical locations, for example, computer systems 201A and 201B may be at a well drilling location, while in communication with one or more computer systems such as 201C and/or 201D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 206 may be implemented as one or more computer-readable or machine-readable storage media. Note that while in the example embodiment of FIG. 10 the storage media 206 are shown as being disposed within the individual computer system 201A, in some embodiments, the storage media 206 may be distributed within and/or across multiple internal and/or external enclosures of the individual computing system 201A and/or additional computing systems, e.g., 201B, 201C, 201D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 200 is only one example of a computing system, and that any other embodiment of a computing system may have more or fewer components than shown, may combine additional components not shown in the example embodiment of FIG. 7, and/or the computing system 200 may have a different configuration or arrangement of the components shown in FIG. 7. The various components shown in FIG. 7 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, GPUs, coprocessers or other appropriate devices. These modules, combinations of these modules, and/or their combination with general hardware are all included within the scope of the present disclosure.

Methods according to the present disclosure may enable more precise determination of a far field source signature affected by surface reflection ghosting without the need to make assumptions about or to estimate from any physical principle a surface reflection function or a surface reflectivity value. It is believed that methods according to the present disclosure will more precisely account for source ghost effects in the near field signature, and thus provide better calculations of the far field source signature.

References cited in the present disclosure include the following:

Ziolkowski, A., Parkes, G., Hatton, L. and Haugland, T., 1982, *The signature of an air gun array: Computation from near field measurements including interactions*, Geophysics, 47, 1413;

Paige, C. C. and M. A. Saunders, 1982, LSQR: *An Algorithm for Sparse Linear Equations And Sparse Least Squares*, ACM Trans. Math. Soft., Vol. 8, pp. 43-71;

G. E. Parkes, A. Ziolkowski, L. Hatton, and T. Haugland, 1984, *The signature of an air gun array: Computation from near-field measurements including interactions—Practical considerations*, Geophysics, 49, 105;

S. Vaage, S. Strandenes, and M. Landro, 1991, *Use of near-field measurements to compute far-field marine source signatures—Evaluation of the method*, First Break, 9, 375;

A. M. Ziolkowski and R. G. K. Johnston, 1997, *Marine seismic sources: Q C of wavefield computation from near-field pressure measurements*, Geophysical Prospecting, 45, 611;

Kragh, E. and Combee, L., 2000, *Using a seismic reflector for resolving streamer depth and sea surface profiles*, First Break, 18 (11);

Hatton, L., 2007, *An empirical relationship between surface reflection coefficient and source array amplitude*, http://www.leshatton.org/Documents/anelastic.pdf;

Hargreaves, N., Grion, S. and Telling, R., 2015, *Estimation of air-gun array signatures from near-gun measurements—least-squares inversion, bubble motion and error analysis*, SEG Technical Program Expanded Abstracts 2015: 149-153; and Wojcik, J, 2004, *Nonlinear reflection and transmission of plane acoustic waves*, Archives of acoustics, 29, 4, 607-632.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for estimating a far field seismic energy source signature, comprising:

entering into a computer detected near field seismic signals corresponding to actuation of each one of a plurality of seismic energy sources in an array of seismic energy sources, the near field seismic signals detected at two spaced apart locations in the near field of each seismic energy source, the at least two spaced apart locations being arranged such that a direction of propagation of the detected near field seismic signals is determinable from the detected near field signals;

in the computer, determining a notional source signature for each seismic energy source and a notional ghost for each seismic energy source using the detected near field seismic signals, wherein the determining a notional source signature and determining a notional ghost comprises inversion of the expression, $$h_i(t) = \sum_{j=1}^{n} p_j(t) * \delta(t - \tau_{ji})/r_{ji} + \sum_{j=1}^{n} a_j(t) * \delta(t - \tau_{gji})/r_{gji}$$

in which $h_i(t)$ denotes the ith seismic sensor data recording with respect to time t, $p_j(t)$ denotes the jth notional source waveform, $r_{ji}$ denotes a possibly time variant distance from a moving seismic energy source bubble to a moving seismic sensor, $a_j(t)$ is a notional ghost waveform, $r_{gji}$ is a distance between a moving virtual source to a moving seismic sensor and $\tau_{ji}$ is a time for seismic energy to travel from an airgun discharge bubble center to the moving seismic sensor, the expression denoted in block matrix form as, $$\begin{pmatrix} D_{11} & D_{1j} & \cdots & D_{1n} & G_{11} & G_{1j} & \cdots & G_{1n} \\ D_{i1} & D_{ii} & \cdots & D_{in} & G_{i1} & G_{ii} & \cdots & G_{in} \\ \vdots & \vdots & & \vdots & \vdots & \vdots & & \vdots \\ \vdots & \vdots & & \vdots & \vdots & \vdots & & \vdots \\ D_{m1} & D_{mj} & \cdots & D_{mn} & G_{m1} & G_{mj} & \cdots & G_{mn} \end{pmatrix} \cdot \begin{pmatrix} p_1 \\ p_j \\ \vdots \\ p_n \\ a_1 \\ a_j \\ \vdots \\ a_n \end{pmatrix} = \begin{pmatrix} h_1 \\ h_i \\ \vdots \\ \vdots \\ \vdots \\ h_m \end{pmatrix}$$

wherein $D_{ij}$ is formed by taking the identity matrix and convolving each column with $\delta(t-\tau_{ji})/r_{ji}$, and $G_{ij}$ is formed by taking the identity matrix and convolving each column with $\delta(t-\tau_{gji})/r_{gji}$;

in the computer, determining a far field signature for each of the plurality of seismic energy sources using the determined notional source signature and notional ghost source signature of each seismic energy source; and using the far field signature for each of the plurality of seismic energy sources to correct distortion in detected reflected seismic signals.

2. The method of claim 1 wherein the determining the notional source signature and notional ghost comprises inverting to obtain upgoing and downgoing components of the detected near field seismic signals.

3. The method of claim 1 wherein upgoing and downgoing components of the detected near field seismic signals are detected using at least two vertically spaced apart near field sensors corresponding to a position in a vertical plane of each seismic energy source in the array.

4. The method of claim 3 wherein the near field sensors comprise hydrophones.

5. The method of claim 3 wherein the near field sensors comprise particle motion detectors.

6. The method of claim 3 wherein upgoing and downgoing components of the near field seismic signals are detected using a hydrophone and a particle motion detector.

7. The method of claim 6 wherein the hydrophone and the particle motion detector are substantially collocated.

8. The method of claim 1 wherein upgoing and downgoing components of the near field seismic signals are detected using a hydrophone and a particle motion detector.

9. The method of claim 8 wherein the hydrophone and the particle motion detector are substantially collocated.

10. The method of claim 1 wherein the near field seismic signals are detected at least twice as many positions as a number of seismic energy sources in the array, the positions of the seismic sensors where the near field seismic signals are detected being separated from each other by a distance selected such that different seismic signals are detected at each of the positions whereby a direction of propagation of the detected near field seismic signals is determinable from the detected near field signals.

11. The method of claim 10 wherein the positions of the seismic sensors wherein the near field seismic signals are detected comprise at least two vertically spaced apart positions with reference to each source in the array.

12. The method of claim 1 wherein the correcting distortion comprises signature deconvolution.

13. A method for seismic surveying, comprising:
at selected times actuating each of a plurality of seismic energy sources in a seismic energy source array in a body of water, the source array comprising a plurality of individual seismic energy sources;
detecting near field seismic energy from each individual seismic energy source at least two separated positions with respect to each of the plurality of individual seismic energy sources;
detecting far field seismic energy from the source array at a plurality of spaced apart locations in the body of water;
entering into a computer the signals representing the detected near field seismic energy;
in the computer, determining a notional source signature for each individual seismic energy source and a notional ghost for each individual seismic energy source using the detected near field seismic energy, wherein the determining a notional source signature and determining a notional ghost comprises inversion of the expression, $$h_i(t) = \sum_{j=1}^{n} p_j(t) * \delta(t - \tau_{ji})/r_{ji} + \sum_{j=1}^{n} a_j(t) * \delta(t - \tau_{gji})/r_{gji}$$

in which $h_i(t)$ denotes the ith seismic sensor data recording with respect to time t, $P_j(t)$ denotes the jth notional source waveform, $r_{ji}$ denotes a possibly time variant distance from a moving seismic energy source bubble to a moving seismic sensor, $a_j(t)$ is a notional ghost waveform, $r_{gji}$ is a distance between a moving virtual source to a moving seismic sensor and $\tau_{ji}$ is a time for seismic energy to travel from an airgun discharge bubble center to the moving seismic sensor, the expression denoted in block matrix form as, $$\begin{pmatrix} D_{11} & D_{1j} & \cdots & D_{1n} & G_{11} & G_{1j} & \ldots & G_{1n} \\ D_{i1} & D_{ii} & \cdots & D_{in} & G_{i1} & G_{ii} & \cdots & G_{in} \\ \vdots & \vdots & & \vdots & \vdots & \vdots & & \vdots \\ \vdots & \vdots & & \vdots & \vdots & \vdots & & \vdots \\ D_{m1} & D_{mj} & \cdots & D_{mn} & G_{m1} & G_{mj} & \cdots & G_{mn} \end{pmatrix} \cdot \begin{pmatrix} p_1 \\ p_j \\ \vdots \\ p_n \\ a_1 \\ a_j \\ \vdots \\ a_n \end{pmatrix} = \begin{pmatrix} h_1 \\ h_i \\ \vdots \\ \vdots \\ \vdots \\ h_m \end{pmatrix}$$

wherein $D_{ij}$ is formed by taking the identity matrix and convolving each column with $\delta(t-\tau_{ji})/r_{ji}$, and $G_{ij}$ is formed by taking the identity matrix and convolving each column with $\delta(t-\tau_{gji})/r_{gji}$, in the computer, determining a far field signature for the plurality of seismic energy sources using the determined notional source signature and notional ghost from each seismic energy source to process the detected far field energy; and using the far field signature to correct distortion in detected seismic signals.

14. The method of claim 13 wherein the determining the notional source signatures and notional ghosts comprises inverting to obtain upgoing and downgoing components of the detected near field seismic signals.

15. The method of claim 14 wherein upgoing and downgoing components of the detected near field seismic signals are detected using at least two vertically spaced apart near field sensors corresponding to a position in a vertical plane of each seismic energy source in the array.

16. The method of claim 13 wherein the near field sensors comprise hydrophones.

17. The method of claim 14 wherein the near field sensors comprise particle motion detectors.

18. The method of claim 13 wherein upgoing and downgoing components of the near field seismic signals are detected using a hydrophone and a particle motion detector.

19. The method of claim 18 wherein the hydrophone and the particle motion detector are substantially collocated.

20. The method of claim 13 wherein the near field seismic signals are detected at least twice as many positions as a number of seismic energy sources in the array, the positions where the near field seismic signals are detected being separated from each other by a distance selected such that different seismic signals are detected at each of the positions whereby a direction of propagation of the detected near field seismic signals is determinable from the detected near field signals.

21. The method of claim 20 wherein the positions where the near field seismic signals are detected comprise at least two vertically spaced apart positions with reference to each source in the array.

22. The method of claim 13 wherein the correcting distortion comprises signature deconvolution.

\* \* \* \* \*